United States Patent [19]

Stulbach et al.

[11] Patent Number: 5,215,156
[45] Date of Patent: Jun. 1, 1993

[54] ELECTRIC VEHICLE WITH DOWNHILL ELECTRO-GENERATING SYSTEM

[75] Inventors: Nathan Stulbach, 40 Brighton First Rd., Brooklyn, N.Y. 11235; Seymour C. Yuter, Briarcliff Manor, N.Y.

[73] Assignee: Nathan Stulbach, Brooklyn, N.Y.

[21] Appl. No.: 905,488

[22] Filed: Jun. 25, 1992

Related U.S. Application Data

[63] Continuation-in-part of Ser. No. 782,902, Oct. 24, 1991, abandoned, which is a continuation-in-part of Ser. No. 698,188, May 6, 1991, abandoned, which is a continuation of Ser. No. 507,625, Apr. 11, 1990, abandoned.

[51] Int. Cl.$^5$ ................................................ B60K 1/02
[52] U.S. Cl. .................... 180/65.3; 180/242; 180/285; 180/165; 310/113; 310/114
[58] Field of Search ............. 180/65.1, 65.2, 65.3, 180/65.4, 2.1, 242, 282, 285, 292, 165; 290/16; 310/112, 113, 114

[56] References Cited

U.S. PATENT DOCUMENTS

| 723,727 | 3/1903 | Pfeil | 180/65.3 X |
|---|---|---|---|
| 1,284,664 | 11/1918 | Hamrick | 180/65.2 X |
| 1,462,903 | 7/1923 | Finley | 239/551 |
| 1,562,903 | 11/1925 | Miller | 180/65.3 |
| 3,477,536 | 11/1969 | Carini | 180/65.5 |
| 3,477,537 | 11/1969 | Plishner | 290/16 X |
| 3,499,163 | 3/1970 | Verreault | 290/16 |
| 3,517,766 | 6/1970 | West | 290/16 X |
| 3,845,835 | 11/1974 | Petit | 180/65.3 |
| 3,921,741 | 11/1975 | Garfinkle et al. | 180/65.2 X |
| 4,181,188 | 1/1980 | Dessert | 180/65.3 X |
| 4,222,450 | 9/1980 | Fobbs | 180/65.3 |
| 4,270,622 | 6/1981 | Travis | 180/65.3 X |
| 4,928,227 | 5/1990 | Burba et al. | 364/424.01 |

FOREIGN PATENT DOCUMENTS

| 0024681 | 3/1981 | European Pat. Off. | 180/65.3 |
|---|---|---|---|
| 2225081 | 1/1974 | Fed. Rep. of Germany | 180/65.3 |
| 2824689 | 12/1979 | Fed. Rep. of Germany | 180/65.3 |
| 514351 | 1/1938 | United Kingdom | 180/65.3 |

*Primary Examiner*—Brian Johnson
*Attorney, Agent, or Firm*—S. C. Yuter

[57] ABSTRACT

A vehicle having an electro-generating system which includes a dynamoelectric generator. The shaft of the dynamoelectric generator is linked directly or indirectly with the rotating axle of the road wheels of the vehicle, preferably via a mechanical turns amplifier. The turns amplifier will multiply the rotation rate of the electro-generating system and increase the production capacity of electric power. The dynamoelectric generator can be utilized to recharge a storage battery driving the vehicle while the car is in motion, especially automatically when the vehicle is going down hill. The vehicle's electric motor can be driven directly from a dynamoelectric generator in place of a storage battery after the vehicle is moving. In railroad cars (freight and passenger) the electro-generating system can be utilized to charge storage batteries, with their electricity utilized for other electro-energy requirements.

15 Claims, 5 Drawing Sheets

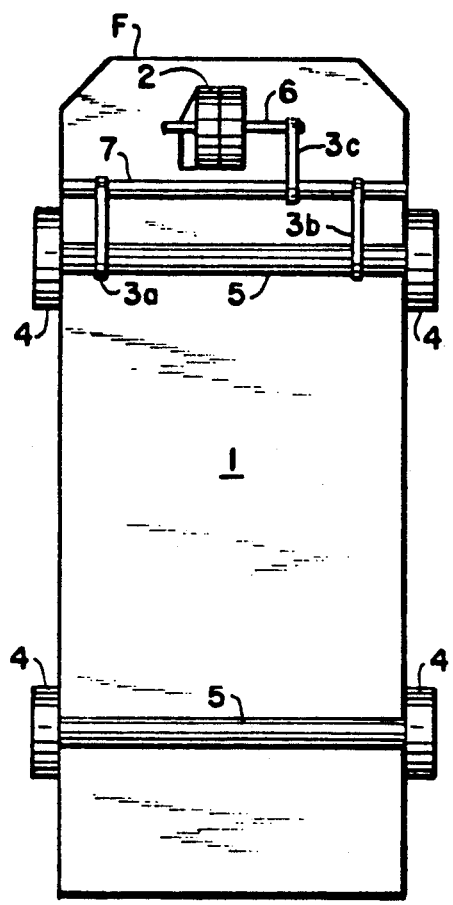
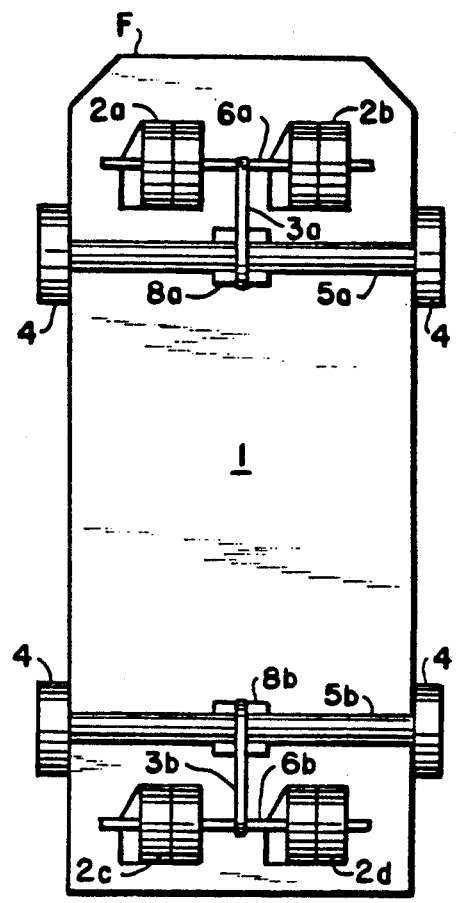
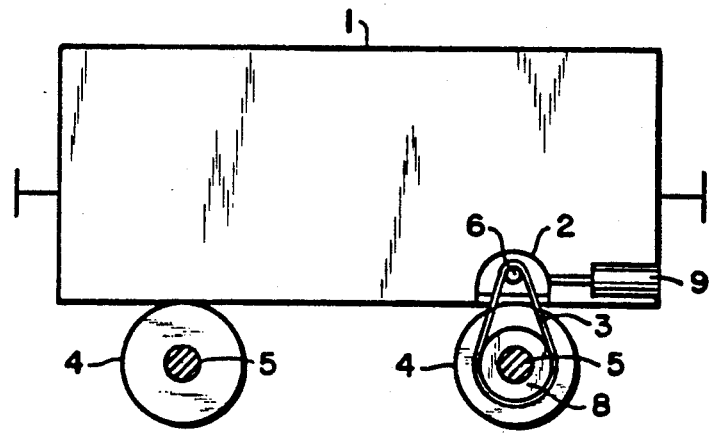

ELECTRIC VEHICLE WITH DOWNHILL ELECTRO-GENERATING SYSTEM

CROSS-REFERENCE TO RELATED APPLICATIONS

This application is a continuation-in-part of prior application Ser. No. 07/782,902, filed Oct. 24, 1991, in turn a continuation-in-part of Ser. No. 07/698,188, filed May 6, 1991, in turn, a continuation of Ser. No. 07/507,625, filed Apr. 11, 1990, all three prior applications having been abandoned.

BACKGROUND OF THE INVENTION

1. Field of the Invention

This invention relates to electric vehicles and more particularly to an electro-generating system for recharging the storage batteries of electric vehicles, especially electric cars and trucks.

2. Description of the Related Art

Electric cars and trucks have been built and marketed by American automobile companies and function well. However, those vehicles depend solely on storage batteries which require charging electric power produced by electric power companies, many of which use relatively expensive crude oil to produce the electricity necessary to recharge the storage batteries. The same is true for trains and subway cars.

Every vehicle, when in motion, performs mechanical work for transporting the vehicle itself and its load from one place to another. Excessive mechanical work has been converted into electrical power to charge storage batteries of electric vehicles. For example, the 1938 British Pat. Specification No. 514,351 of L. R. Merville for an Apparatus for Recharging Electric Traction Accumulators discloses a gear keyed directly onto the drive shaft of an electric vehicle driving a second smaller diameter gear which is keyed to the shaft of an electric generator. Merville states that the generator may be driven by any rotating part of the vehicle, for example, the axle shaft. Merville was cited in U.S. Pat. No. 3,477,536 issued Nov. 11, 1969 to E. P. Carini for an Electric Drive System.

Also cited in the 1979 Application as disclosing electric vehicles which convert mechanical motion into battery charging electricity are U.S. Pat. No. 1,462,903 issued Nov. 24, 1925 to A. Miller for Electrical Drive for Automobiles; U.S. Pat. No. 3,845,835 issued Nov. 7, 1974 to E. W. Petit for Electric Power Plant for Land Vehicles, and U.S. Pat. No. 3,499,163 issued Mar. 3, 1970 to J. W. Verreault for Accelerator Release Control for Battery Charging Systems. Miller discloses a hand operated clutch for switching the storage battery from the drive motor to a dynamo when going downhill to charge the storage battery. Verreault discloses a battery charging system wherein a charging generator is connected to the power train between thee motor and the vehicle driving means by a normally disengaged clutch which, when activated, causes the momentum of the vehicle under coasting conditions to drive the charging generator and recharge the battery. Petit discloses two alternators on the drive axle of the vehicle which alternately charge two sets of batteries.

There is a need for an improved electric vehicle which will be able to convert excess mechanical energy into electrical power to charge the vehicles storage batteries, especially when the vehicle is going downhill. That is especially true when the price of crude oil is relatively high and so much crude oil needs to be imported with a corresponding negative impact on America's balance of trade.

SUMMARY OF THE INVENTION

The principal object of the present invention is to provide an improved source of energy through conservation and reclamation of mechanical energy lost by millions of moving automobiles, truck, railroad cars (freight and passenger), subway cars and other vehicles, and to convert the reclaimed mechanical energy into electrical power.

It is accordingly an object of the present invention to provide an improved electro-generating system for vehicles.

A further object of the present invention is to provide an improved electric car which utilizes the mechanical power produced by the car and converts it into electrical power for use in connection with driving the car.

Still another object of the present invention is to provide an improved electric vehicle which reclaims the mechanical energy lost when the vehicle moves or is braked.

A further object of the present invention is to provide an improved electro-generating system which, when utilized in railroad and subway care propelled by the rotary motion of their road wheels, will generate electric power and charge sets of storage batteries with electricity for usage elsewhere.

Still a further object of the present invention is to provide an improved electric automobile which achieves lower cost of transportation through utilizing reclaimed mechanical energy, especially when the vehicle is going downhill.

Briefly, in accordance with the present invention, there is provided a vehicle having an electro-generating system including an electric generator. The shaft of the electric generator is linked by a mechanical turns amplifier either directly or indirectly with the rotating axle of the road wheels of the vehicle to thereby convert the mechanical energy of the moving vehicle into electric energy.

A feature of the invention is a separate electro-generating system for an electric vehicle which automatically functions when the vehicle is going downhill or is being braked so that the energy used to drive the vehicle uphill or brake it is reclaimed to help charge the vehicle's storage battery.

In one embodiment of the invention, the electro-generating system is used to charge a storage battery with electricity while the car is in motion with the storage battery being utilized to propel the vehicle.

In another embodiment of the invention, the electro-generating system is used to charge a storage battery with electricity while the car is in motion with a gasoline motor being utilized to propel the vehicle.

In still another embodiment of the invention the electro-generating system is used to charge storage batteries in a railroad car with the electricity accumulated and utilized for any and all electric energy requirements.

In a further embodiment of the invention the electro-generating system is automatically used to drive the vehicle's motor directly after the vehicle is started by the storage battery and has achieved significant speed.

The aforementioned objects, features and advantages of the invention will, in part, be pointed out with particularity, and will, in part become obvious, from the following more detailed description of the invention, taken in conjunction with the accompanying drawings, which form an integral part thereof,

BRIEF DESCRIPTION OF THE DRAWINGS

FIG. 3 is a schematic plan view of a vehicle and showing an electro-generating system coupled through an auxiliary drive member.

FIG. 4 is a schematic plan view of a vehicle showing a plurality of dynamoelectric generators.

FIG. 5 is a schematic vertical sectional view of a vehicle showing an electro-generating system coupled to the vehicle axis through a turns amplifier.

In the various figures of the drawings, like references characters designate like parts.

DESCRIPTION OF THE PREFERRED EMBODIMENTS

Figure 1:
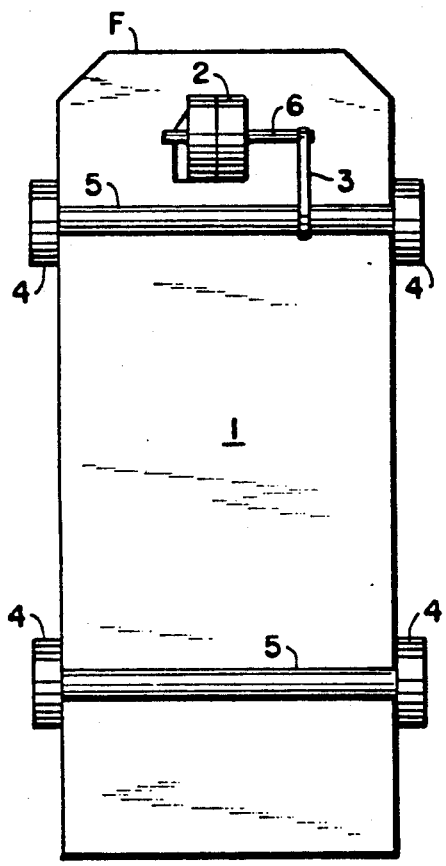
FIG. 1 is a schematic plan view of a vehicle showing an electro-generating system coupled directly to the vehicle axle.

Referring now to FIG. 1 there is shown an electro-generating assembly having a dynamoelectric generator 2 in front F of the electric car 1. The generator's axis 6 is linked by a rotary motion transferring device, as gear, belt, band, etc. 3 with the car's road wheel axis 5.

FIG. 1 illustrates the basic constructional and functional features of the electro-generating assembly provided by the invention. The rotary motion of the car's revolving road-wheels 4 is transmitted to the dynamoelectric generator 2 by means of the rotary motion transferring device 3 such a gear, band, belt, etc.

Figure 2:
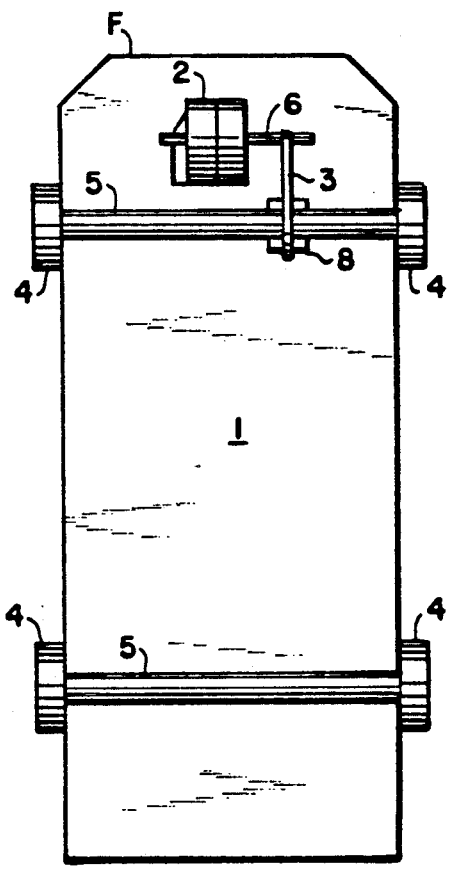
FIG. 2 is a schematic plan view of a vehicle and showing a dynamoelectric generator coupled to the vehicle axis through a turns amplifier.

Referring now to FIG. 2 there is shown as electro-generating assembly having a dynamoelectric generator 2 in front F of the vehicle 1. The generator's axis 6 is linked by a rotary motion transferring device 3 with the vehicle's road-wheel axis 5. The circumference of the vehicle's road-wheel axis 5 is enlarged on the spot 8 where the rotary motion transferring device 3 engages the road-wheel axis 5.

In addition to the feature shown in FIG. 1, FIG. 2 illustrates also another basic structural and functional feature of the electro-generating assembly. In order to manifold or multiply the number of revolutions per minute of the rotating dynamoelectric generator 2 the circumference of the vehicle's road-wheel axis 5 is purposely enlarged, by a drum 8 having an outside diameter larger than the outside diameter of the axis 6 where the rotary motion transferring device 3 engages the vehicle's road-wheel axis 5. For the same purpose the circumference of the generator's axis 6 is to be kept as small as practically possible; that is, the outside diameter of the axis 6 is smaller than the outside diameter of the road wheel axis 5.

Referring now to FIG. 3 there is shown an electro-generating assembly having a dynamoelectric generator 2 in front F of the vehicle 1. The generator's axis 6 is linked by a rotary motion transferring device 3c with the supplementary axis 7. The supplementary axis 7 is linked by rotary motion transferring devices 3a, 3b with the vehicles's road-wheel axis 5.

In the embodiment of FIG. 3, the electro-generator's axis 6 is basically linked directly with the vehicle's road-wheel axis 5. However, if necessary, for purposes of proper positioning of the electro-assembly, a rotating supplementary axis 7 or axes, parallel to the road-wheel axes 5 of the vehicle, may be constructed. The supplementary axis 7 is linked by rotary motion transferring devices 3a, 3b with the vehicle's road-wheel axis 5 on one side and by a rotary motion transferring device 3c with the rotating axis 6 of the dynamoelectric generator on the other side.

The embodiment of FIG. 3 illustrates only in a plain way the idea in cases when the transfer of the rotary motion through an auxiliary drive member is necessary.

Referring now to FIG. 4 there is shown an electro-generating assembly having a multitude of generators, 2a, 2b, 2c, 2d in both the front F and rear of the vehicle. The generator's axes 6a, 6b are linked by rotary motion transferring devices 3a, 3b with the vehicle's road-wheel axes 5a, 5b. The circumferences of the vehicle's road-wheel axes 5a, 5b are enlarged on the spots 8a, 8b where the rotary motion transferring devices 3a, 3b engage the road-wheel axes 5a, 5b.

In the embodiment of FIG. 4, in order to acquire larger quantities of electricity, a multi-generator system is installed engaging one or more of the vehicle's road-wheel axes. Specifically, FIG. 4 shows a plurality of dynamoelectric generators 2a, 2b, 2c, 2d installed in the vehicle. The axes 6a, 6b of the generators are linked by rotary motion transferring devices 3a, 3b to the vehicle's road-wheel axes 5a, 5b. Identically as described above in connection with FIG. 2, the vehicle's road-wheel axes 5a, 5b are purposely enlarged on the spots 8a, 8b where the rotary motion transferring devices 3a, 3b engage them in order to increase the number of revolutions per minute of the generators' axes 6a, 6b. All generators are driven simultaneously and the electric production is multiplied accordingly to the number and capacity of generators installed.

Referring now to FIG. 5 there is shown an electro-generating assembly in an electricity producing railroad car having a dynamoelectric generator 2. The generator's axis 6 is linked by a rotary motion transferring device 3 with the car's road-wheel axis 5, identically as in FIG. 2. The circumference of the car's road-wheel axis 5 is enlarged on the spot 8 in order to multiply the number of turns of generator's axis 6. The output of the dynamoelectric generator is coupled to the storage batteries 9, with the accumulated electric energy to be used for any and all electric power requirements outside the electro-producing car.

Accordingly, as described, there is shown an electric car with an improved electric generating system. Electric cars, as known at the present time, are driven by electric power from their storage batteries, e.i., electricity derived from the outside. When the electro-generating system provided by this invention is added to their construction it will constantly be charging the storage batteries with electricity while the car is in motion, thus accumulating in the batteries the electric power produced by every revolution of the car's road-wheels, and using the electricity from the batteries to propel the car.

As described, there is also shown the provided electro-generating assembly installed in the rail-road car with the purpose of electrical power production on a large scale. Every train freight and passenger car, when equipped with the described by this invention electro-generating assembly and sets of storage batteries, can be converted into a small power plant, and the stored electric energy generated by each vehicle can be used to propel electric automobiles or any other purpose where electric power is required.

The principle concerning ENERGY CONSRVATION and UTILIZATION outlined hereby is not restricted solely to the electric automobile and rail-road car but relates to all other active, rotating vehicles and machines. The general idea is that the rotary motion of engines and vehicles already working for any productive purpose can be utilized to simultaneously propel dynamoelectric generators and produce electricity as a by-product, which per se becomes instantly a very valuable basic product indeed. The cost of such energy production would be minimal since no additional fuel for vehicles already working on road, rails, factories, etc. would be required. The realization of such installations en masse may produce invaluable results of enormous national importance.

Figure 6:
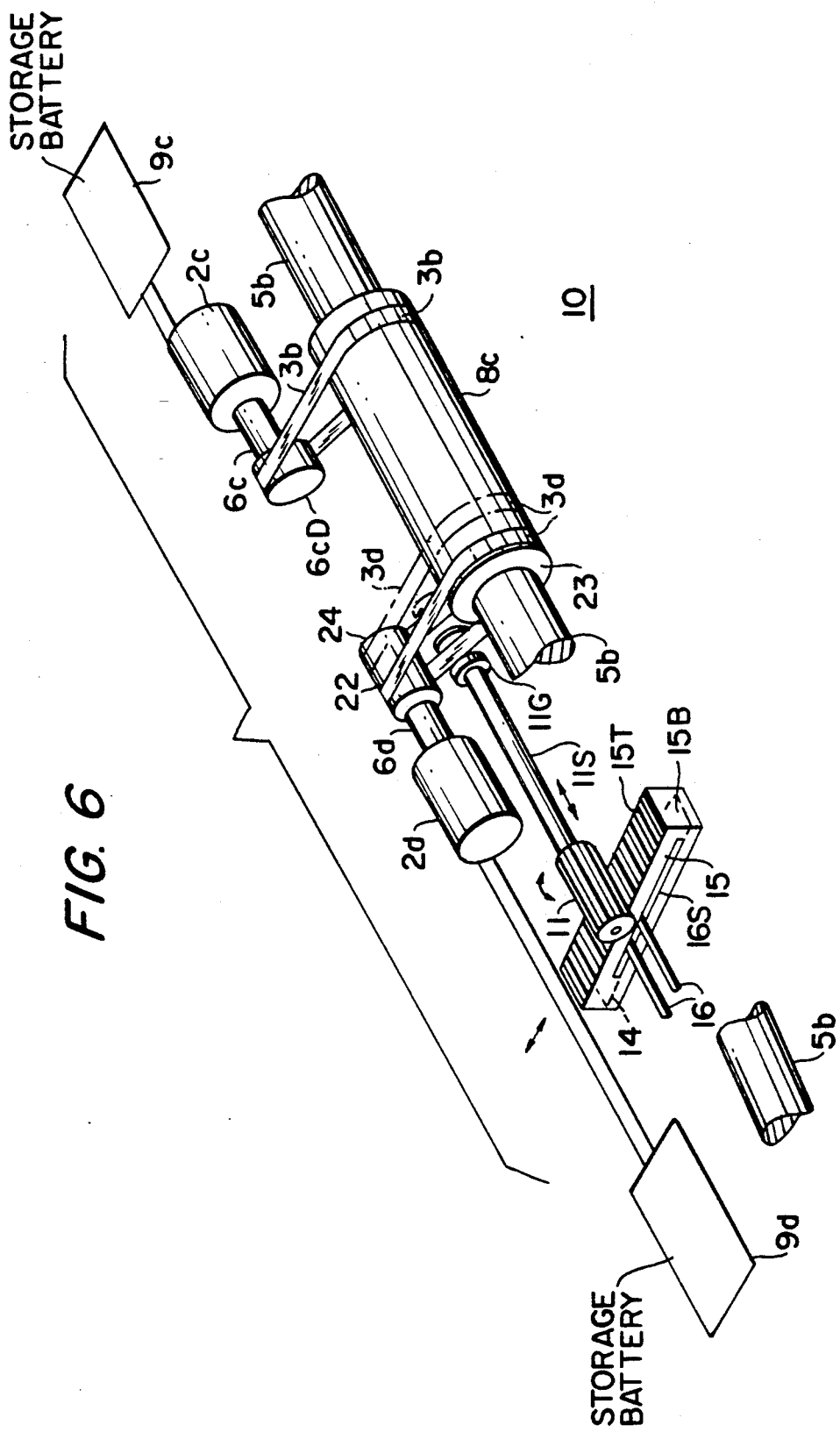
FIGS. 6 and 7 are a schematic perspective view showing an electro-generating system of a vehicle for automatically generating battery-charging electricity only when the vehicle is going downhill in combination with a turns amplifier on a vehicle axle which drives the wheels of the vehicle, in accordance with the best mode of the invention.
Figure 7:
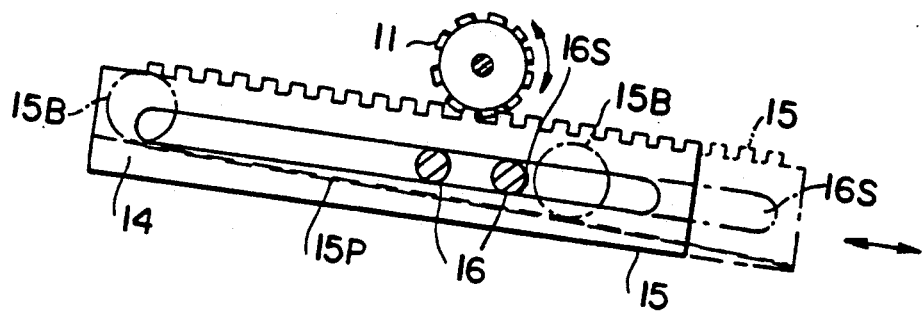
Figure 7A:
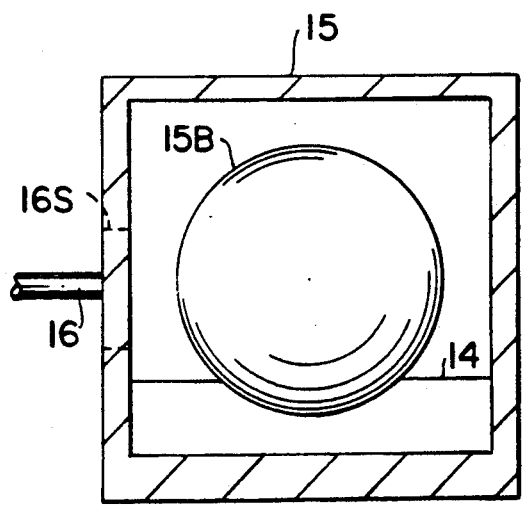
FIGS. 7A and 7B are cross-sectional views of a housing of part of the downhill electro-generating system shown in FIG. 7.

The principle concerning ENERGY CONSERVATION and UTILIZATION taught in the embodiments of the invention disclosed in FIGS. 1-5 and described above is especially utilized in the embodiment of the invention disclosed in FIGS. 6 and 7. FIGS. 6 and 7 disclose an improvement which employs the energy used to drive a vehicle uphill to be partially recovered when the vehicle goes downhill.

Referring to FIG. 6, an electro-generating system 10 is shown comprising turns amplifier 8c, in the shape of a drum, fixedly mounted on road-wheel axis or axle 5b, dynamoeletric generator 2c and downhill dynamoelectric generator 2d. Generator 2c is driven via shaft 6c and drum 6cD from turns amplifier 8c by belt 3b, as similarly shown in FIG. 4, and generates electricity whenever the axle 5b turns to charge electrically-coupled storage battery 9c, as shown in FIG. 5.

The shaft 6d of generator 2d has a freely rotating drum 22 journaled on it together with an adjacent fixed drum 24 of exactly the same outer diameter. Belt 3d is continuously driven by a fixed drum portion 23 of turns amplifier 8c to continuously rotate freely rotating drum 22. Belt 3d normally (when the vehicle is level or going uphill) rides on turns amplifier 8c and drum 22. Since drum 22 freely rotates, generator 2d is not normally driven.

A downhill sensing device 14 functions to move the continuously rotating belt 3d from the freely rotating drum 22 and along the fixed turns amplifier 8c to fixed drum 24 by means of telescoping gear 11 whenever the vehicle goes downhill, whereby generator 2d always generates electricity when the vehicle is going-hill to charge electrically-coupled storage battery 9d, but never when it is level or going uphill.

Downhill sensing device 14 comprises a slide mounted housing 15 mounted at a 10 degree angle with respect to the horizontal plane on a pair of pins 16 which are adapted to slide in the slot 16S on the housing 15. Inside housing 15 is a spherical ball 15B which is adapted to roll within housing 15 up an inclined plane 15P (FIG. 7) when the vehicle is going down more than a 10 degree hill.

Housing 15 (FIG. 6) is mechanically and automatically coupled to telescopic gear 11 with gear teeth 15T on housing 15. When housing 15 moves to the left it drives telescoping gear 11. When telescoping gear 11 is rotated, its shaft 11S telescopes outwardly to move groove 11G outwardly. Groove 11G slidingly engages belt 3d, so when it moves outwardly it moves continuously rotating belt 3d from the freely rotating drum 22 to the fixed drum 24 and along the turns amplifier 8c to drive generator 2d. The turns amplifier 8c is mounted on axle 5b.

Figure 7B:
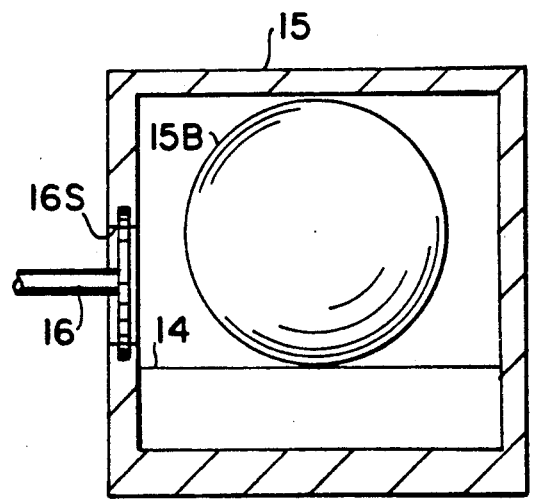

Referring to FIG. 7, the operation of slide mounted housing 15 is shown. In normal operation (when the vehicle is level or going uphill), spherical ball 15B is at the right end of housing 15. When the vehicle goes over the top of a hill and then goes down more than a 10 degree hill spherical ball 15B rolls from the right end of housing 15 up the inclined plane 15P to the other end of housing 15. Housing 15 then slides to the left on pins 16 (FIG. 6), which are fixed to the vehicle's body, along slot 16S. Each pin 16 terminates in a flange (FIG. 7B) which rides in upper and lower slotted rails in the left sidewall of housing 15 along slot 16S. A similar mechanism supports the other side of housing 15. As housing 15 slides to the left its gear teeth 15T turn telescoping gear 11 so that generator 2d generates electricity as described above.

When the vehicle levels, spherical ball 15B rolls down the inclined plane 15P to the right end of housing 15 and housing 15 slides back along slot 16S to its rightmost position. That turns telescopic gear 11 in the opposite direction, withdrawing groove 11G inward and thus moving the belt 3d from the fixed drum 24 and along turns amplifier 8c back to the freely rotating drum 22. Generator 2d is then not turned so no electricity is generated when the vehicle is in the level position.

The same action occurs if the vehicle goes from downhill to uphill as from downhill to level. That is, the spherical ball 15B moves from the left end of housing 15 to its right end, so generator 2d does not generate any electricity when the vehicle is going uphill.

Slide mounted housing 15 is mounted parallel to the sides of the vehicle so that spherical ball 15B can move left or forward to cause the housing 14 to engage generator 2d. Acceleration or deceleration when the vehicle is going up or down hill does not normally move spherical ball 15B and thus housing 14 substantially enough, because of the mass of spherical ball 15B and housing 14, to change the engagement of generator 2d.

Stops, not shown, limit the forward and rearward movement of housing 15, which may also ride on rollers, not shown.

Accordingly, the electro-generating system 10 shown in FIGS. 6 and 7 automatically generates electricity when the vehicle is going downhill via the generator 2d and always generates electricity whenever the vehicle is moving via generator 2c.

Figure 8:
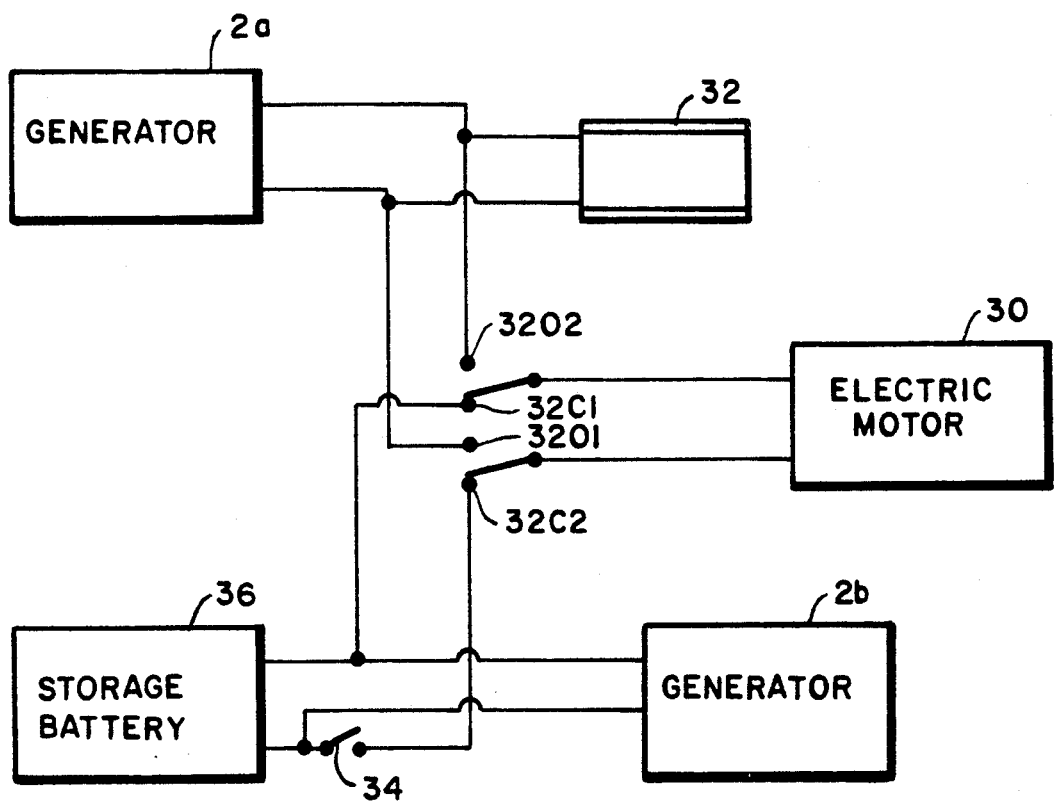
FIG. 8 is an electrical schematic diagram of a system for automatically switching the vehicle's electric motor from the storage battery directly to the electro-generating system, in accordance with an alternative embodiment of the invention.

Referring to FIG. 8. the herewith provided electro-generating assembly is employed to directly energize the driving motor in the electric car when it s moving at a significant speed thus omitting some usage of the storage batteries while driving. The storage batteries in such a car are used for initial thrust to impart starting motion to the car and to speed the car up when it slows down.

Electric motor 30, which drives the vehicle, is connected via normally closed contacts 32C1 and 32C2 of relay 32 and then via drive switch 34 to storage battery 36. Normally open contacts 3201 and 3202 of relay 32 are connected to the electrical output of generator 2a (also see FIG. 4). Generator 2b may be used to charge storage battery 36 directly in accordance with well-known art.

Drive switch 34 when closed connects the battery 36 to the electric motor 30 to start the car and get it moving. As indicated above, generator 2a generates electricity when the vehicle is moving. The voltage output of generator 2a increases to a maximum level as the rotation of its shaft 6 increases. Relay 32 is selected to operate at just below that maximum voltage. When relay 32 operates, its normally open contacts 3201 and 3202 are closed connecting the output of generator 2a directly to electric motor 30. At that point the electric motor 30 is operated directly from the generator 2a and the storage battery 36 is not connected to the electric motor 30, thus conserving its energy.

When the vehicle slows down to the point that the voltage output of generator 2a falls below the relay 32 operating voltage, relay 32 is deactivated and the electric motor 30 is then switched from the generator 2a back to the battery 36.

The approximate vehicle speed at which the electric motor 30 is switched to the generator 2a is determined by selecting the relay 32 operating voltage to approximate the generator 2a maximum voltage at that speed.

Accordingly, an electro-generating system for an electric vehicle is disclosed in which a generator drives the vehicle's electric motor directly once the vehicle is moving and the storage battery is disconnected from the electric motor to conserve energy. Another generator always charges the storage battery when the vehicle is moving.

While the applicants describe the embodiments comprising the principle elements of the invention it is to be understood that they do not limit themselves to the precise constructions herein disclosed and that various modifications and changes can be made within the scope of this invention.

What is claimed is:

1. A vehicle adapted to be driven by an electrical motor electrically connected to charge storage battery means and having an electro-operating system comprising a first dynamoelectric generator, first mechanical turns amplifier means for coupling said first dynamoelectric generator to a road wheels axle of the vehicle, a second dynamoelectric generator, downhill sensing means coupled to a portion of the vehicle, and second mechanical turns amplifier means responsive to said downhill sensing means for automatically coupling said second dynamoelectric generator to a road wheels axle of the vehicle only when the vehicle is going downhill, whereby said first dynamoelectric generator is driven by the amplified rotation of the axle whenever said axle rotates thereby converting movement of the vehicle into electrical energy, and said second dynamoelectric generator is automatically driven by the amplified rotation of the axle only when said vehicle is going downhill thereby converting downhill movement of the vehicle into electrical energy.

2. A vehicle adapted to be driven by an electrical motor electrically connected to charged storage battery means and having an electro-generating system according to claim 1, said storage battery means controllably coupled to said electric motor for turning said electric motor, first electrical coupling means for coupling the electrical energy generated by said first dynamoelectric generator to said storage battery means for charging said storage battery means whenever the vehicle is in motion, and second electrical coupling means for coupling the electrical energy generated by said second dynamoelectric generator to said storage battery means for charging said storage battery means only when the vehicle is going downhill.

3. A vehicle adapted to be driven by an electrical motor electrically connected to charged storage battery means and having an electro-generating system according to claim 2 wherein said first mechanical turns amplifier means comprises a drum fixedly connected to said road wheels axle and with an outside diameter larger than the outside diameter of said axle, said first dynamoelectric generator having a driven shaft with an outside diameter smaller than the outside diameter of said road wheels axle.

4. A vehicle adapted to be driven by an electrical motor electrically connected to charged storage battery means and having an electro-generating system according to claim 3 wherein said second mechanical turns amplifier means comprises a second drum fixedly connected to said road wheels axle and having an outside diameter larger than the outside diameter of said axle, said second dynamoelectric generator having a driven shaft with an outside diameter smaller than the outside diameter of said road wheels axle.

5. A vehicle adapted to be driven by an electrical motor electrically connected to charged storage battery means and having an electro-generating system comprising a first dynamoelectric generator, first mechanical turns amplifier means for coupling said first dynamoelectric generator to a road wheels axle of the vehicle, said first mechanical turns amplifier means comprising a drum fixedly connected to said road wheels axle and with an outside diameter larger than the outside diameter of said axle, said first dynamoelectric generator having a driven shaft with an outside diameter smaller than the outside diameter of said road wheels axle, a second dynamoelectric generator, second mechanical turns amplifier means for automatically coupling said second dynamoelectric generator to a road wheels axle of the vehicle only when the vehicle is going downhill, said second mechanical turns amplifier means comprising a second drum fixedly connected to said road wheels axle and having an outside diameter larger than the outside diameter of said axle, said second dynamoelectric generator having a driven shaft with an outside diameter smaller than the outside diameter of said road wheels axle, whereby said first dynamoelectric generator is driven by the amplified rotation of the axle whenever said axle rotates thereby converting movement of the vehicle into electrical energy, and said second dynamoelectric generator is automatically driven by the amplified rotation of the axle only when said vehicle is going downhill thereby converting downhill movement of the vehicle into electrical energy, said second mechanical turn amplifier means further comprising a third drum fixedly mounted on said road wheels axle adjacent to and concentrically with and having the same diameter as said second drum, a fourth drum freely rotationally mounted on the shaft of said second dynamoelectric generator, a continuously rotatable looped belt coupling said third and fourth drums, a fifth drum fixedly mounted on said shaft of said second dynamoelectric generator adjacent to and concentrically with and having the same diameter as said fourth drum, downhill sensing means coupled to a portion of the vehicle for sensing when the vehicle is going downhill and for moving said continuously rotatable looped belt to said fixedly mounted fifth drum, whereby when said vehicle is going downhill said shaft of said second dynamoelectric generator is driven to generate electrical energy, said storage battery means controllably coupled to said electric motor for turning said electric motor, first electrical coupling means for coupling the electrical energy generated by said first dynamoelectric generator to said storage battery means for charging said storage battery means whenever the vehicle is in motion, and second electrical coupling means for coupling the electrical energy generated by said second dynamoelectric generator to said storage battery means for charging said storage battery means only when the vehicle is going downhill.

6. A vehicle adapted to be driven by an electrical motor electrically connected to charged storage battery means and having an electro-generating system according to claim 5 wherein said downhill sensing means comprises a slide mounted housing enclosing a spherical ball normally positioned at one end when the vehicle is level and going up hill, said spherical ball moving to the other end of said slide mounted housing when the vehicle is going downhill to slide said other end of said slide mounted housing forward, and mechanical linkage means linking said other end of said slide mounted housing to said continuously rotatable looped belt and adapted to move said continuously rotatable looped belt from said freely rotational fourth drum, which does not drive said shaft of said second dynamoelectric generator, to said fixed fifth drum, which drives said shaft of said second dynamoelectric generator when said slide mounted housing is slid forward because the vehicle is going downhill.

7. A vehicle adapted to be driven by an electrical motor electrically connected to charge storage battery means and having an electro-generating system comprising a dynamoelectric generator, downhill sensing means coupled to a portion of the vehicle, and automatic coupling means for automatically coupling said dynamoelectric generator to a road wheels axle of the vehicle in response to said downhill sensing means only when the vehicle is going downhill, whereby said dynamoelectric generator is automatically driven by the rotation of the road wheels axle only when said vehicle is going downhill, thereby converting downhill movement of the vehicle into electrical energy, whereby said dynamoelectric generator does not turn and electricity is not generator during the time said vehicle is moving along level ground.

8. A vehicle adapted to be driven by an electrical motor electrically connected to charged storage battery means and having an electro-generating system according to claim 7, said storage battery means controllably coupled to said electric motor for turning said electric motor, and electrical coupling means for coupling the electrical energy generated by said dynamoelectric generator to said storage battery means for charging said storage battery means only when the vehicle is going downhill.

9. A vehicle adapted to be driven by an electrical motor electrically connected to charged storage battery means and having an electro-generating system comprising a dynamoelectric generator, downhill sensing means coupled to a portion of the vehicle, and automatic coupling means for automatically coupling said dynamoelectric generator to a road wheels axle of the vehicle in response to said downhill sensing means only when the vehicle is going downhill, whereby said dynamoelectric generator is automatically driven by the rotation of the road wheels axle only when said vehicle is going downhill, thereby converting downhill movement of the vehicle into electrical energy, said storage battery means controllably coupled to said electric motor for turning said electric motor, and electrical coupling means for coupling the electrical energy generated by said dynamoelectric generator to said storage battery means for charging said storage battery means only when the vehicle is going downhill, and wherein said automatic coupling means comprises a first drum fixedly mounted on said road wheels axle, a second drum freely rotationally mounted on the shaft of said dynamoelectric generator, a third drum fixedly mounted on the shaft of said dynamoelectric generator adjacent to and concentrically with and having the same diameter as said second drum, a continuously rotatable looped belt coupling said first and second drums, said downhill sensing means sensing when the vehicle is going downhill and for moving said looped belt to said fixedly mounted third drum, whereby when said vehicle is going downhill said shaft of said dynamoelectric generator is driven to generate electrical energy.

10. A vehicle adapted to be driven by an electrical motor electrically connected to charged storage battery means and having an electro-generating system according to claim 9 wherein said downhill sensing means comprises a slide mounted housing enclosing a spherical ball normally positioned at one end when the vehicle is level and going up hill, said spherical ball moving to the other end of said slide mounted housing when the vehicle is going downhill to slide said other end of said slide mounted housing forward, and mechanical linkage means linking said other end of said slide mounted housing to said continuously rotatable looped belt and adapted to move said continuously rotatable looped belt to said fixed third drum, which drives said shaft of said second dynamoelectric generator when said slide mounted housing is slid forward because the vehicle is going downhill.

11. A vehicle adapted to be driven by an electrical motor electrically connected to charge storage battery means and having an electro-generating system comprising a dynamoelectric generator, downhill sensing means coupled to a portion of the vehicle, and automatic coupling means for automatically coupling said dynamoelectric generator to a road wheels axle of the vehicle in response to said downhill sensing means only when the vehicle is going downhill, whereby said dynamoelectric generator is automatically driven the rotation of the road wheels axle only when said vehicle is going downhill, thereby converting downhill movement of the vehicle into electrical energy, said storage battery means controllably coupled to said electric motor for turning said electric motor, and electrical coupling means for coupling the electrical energy generated by said dynamoelectric generator to said storage battery means for charging said storage battery means only when the vehicle is going downhill, and wherein said automatic coupling means comprises a first drum fixedly mounted on said road wheels axle, a second drum mounted adjacent to and concentrically with and having the same diameter as said first drum fixedly mounted on said road wheels axle, a third freely rotatable drum mounted on the shaft of said dynamoelectric generator, a fourth drum fixedly mounted on the shaft of said dynamoelectric generator adjacent to and concentrically with and having the same diameter as said third drum, a continuously rotatable looped belt coupling said first and third drums, said downhill sensing means for sensing when the vehicle is going downhill and for moving said looped belt from said first and third drums to said fixedly mounted second and fourth drums, whereby when said vehicle is going downhill said shaft of said dynamoelectric generator is driven to generate electrical energy.

12. A vehicle adapted to be driven by charged storage battery means and having an electro-generating system comprising an electric motor for moving said vehicle by means of a power train, said storage battery means controllably coupled to said electric motor for turning said electric motor, a first dynamoelectric generator, first mechanical coupling means for coupling said first dynamoelectric generator to said power train between said electric motor and the road wheels of the vehicle, a second dynamoelectric generator, downhill sensing means coupled to a portion of the vehicle, second mechanical coupling means responsive to said downhill sensing means for automatically coupling said second dynamoelectric generator to said power train only when the vehicle is going downhill, whereby said first dynamoelectric generator is driven by the rotation of said power train whenever said power train rotates thereby converting movement of the vehicle into electrical energy, said second dynamoelectric generator being automatically driven by the rotation of said power train only when said vehicle is going downhill thereby converting downhill movement of the vehicle into electrical energy, first electrical coupling means for coupling the electrical energy generated by said first dynamoelectric generator to said storage battery means for charging said storage battery means whenever the vehicle is in motion, and second electrical coupling means for coupling the electrical energy generated by said second dynamoelectric generator to said storage battery means for charging said storage battery means only when the vehicle is going downhill.

13. A vehicle adapted to be driven by charged storage battery means and having an electro-generating system comprising an electric motor connected to a power train, storage battery means controllably coupled to said electric motor for turning said electric motor, a first dynamoelectric generator, first mechanical turns amplifier means for coupling said first dynamoelectric generator to said power train between said electric motor and the road wheels of the vehicle, a second dynamoelectric generator, downhill sensing means coupled to a portion of the vehicle, second mechanical turns amplifier means mechanically connected to said downhill sensing means for automatically coupling said second dynamoelectric generator to said power train only when the vehicle is going downhill, whereby said first dynamoelectric generator is driven by the amplified rotation of said power train whenever said power train rotates thereby converting movement of the vehicle into electrical energy, said second dynamoelectric generator is automatically driven by the amplified rotation of said power train only when said vehicle is going downhill thereby converting downhill movement of the vehicle into electrical energy, first electrical coupling means for coupling the electrical energy generated by said first dynamoelectric generator to said storage battery means for charging said storage battery means whenever the vehicle is in motion, and second electrical coupling means for coupling the electrical energy generated by said second dynamoelectric generator to said storage battery means for charging said storage battery means only when the vehicle is going downhill.

14. A vehicle adapted to be driven by charged storage battery means and having an electro-generating system comprising a dynamoelectric generator, downhill sensing means coupled to a portion of the vehicle, mechanical coupling means connected to said downhill sensing means for coupling said dynamoelectric generator to a road wheels axle of the vehicle only when the vehicle is going downhill thereby converting downhill movement of the vehicle into electrical energy, an electric motor coupled to said road wheels axle, and electrical coupling means for coupling the electrical energy generated by said dynamoelectric generator to said electric motor only when the vehicle is going downhill, whereby said dynamoelectric generator does not turn and electricity is not generated during the time said vehicle is moving along level ground.

15. A vehicle adapted to be driven by charged storage battery means and having an electro-generating system comprising a dynamoelectric generator, downhill sensing means coupled to a portion of the vehicle, mechanical coupling means connected to said downhill sensing means for coupling said dynamoelectric generator to a road wheels axle of the vehicle only when the vehicle is going downhill thereby converting downhill movement of the vehicle into electrical energy, an electric motor coupled to said road wheels axle, and electrical coupling means for coupling the electrical energy generated by said dynamoelectric generator to said electric motor only when the vehicle is going downhill and wherein said mechanical coupling means coupled to a road wheels axle comprises a turns amplifier.

* * * * *